United States Patent
Thiruchengode Vajravel et al.

(10) Patent No.: US 12,339,947 B2
(45) Date of Patent: Jun. 24, 2025

(54) SELECTIVELY VALIDATING AND ENABLING RESOURCE ENABLERS OF A SECURE WORKSPACE

(71) Applicant: Dell Products L.P., Round Rock, TX (US)

(72) Inventors: Gokul Thiruchengode Vajravel, Bangalore (IN); Amy Christine Nelson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 341 days.

(21) Appl. No.: 18/164,678

(22) Filed: Feb. 6, 2023

(65) Prior Publication Data

US 2024/0265084 A1   Aug. 8, 2024

(51) Int. Cl.
  *G06F 21/00*   (2013.01)
  *G06F 21/44*   (2013.01)

(52) U.S. Cl.
  CPC .................. *G06F 21/44* (2013.01)

(58) Field of Classification Search
  CPC ....................................................... G06F 21/44
  See application file for complete search history.

(56) References Cited

U.S. PATENT DOCUMENTS

| | | | | |
|---|---|---|---|---|
| 9,652,625 | B1* | 5/2017 | Levchenko | G06F 21/6209 |
| 2015/0089571 | A1* | 3/2015 | Srinivasan | H04W 12/06 726/1 |
| 2015/0281282 | A1* | 10/2015 | Medappa | H04L 63/0263 726/1 |
| 2018/0183880 | A1* | 6/2018 | Olcese | H04L 63/083 |
| 2021/0318985 | A1* | 10/2021 | Hrivnak | G06F 9/5011 |
| 2022/0382698 | A1* | 12/2022 | Chen | G06F 13/385 |
| 2025/0036750 | A1* | 1/2025 | Cronholm | G06F 21/53 |

\* cited by examiner

*Primary Examiner* — Rodman Alexander Mahmoudi
(74) *Attorney, Agent, or Firm* — Kirton McConkie; Brian Tucker

(57) ABSTRACT

Resource enablers of a secure workspace can be selectively validated and enabled. Resource enablers can be configured to selectively allow an application hosted in a secure workspace to access an external resource based on a trust of the application and/or of the external resource. As a result, the security of the secure workspace can be maintained without having to restrict all access to external resources.

20 Claims, 11 Drawing Sheets

SELECTIVELY VALIDATING AND ENABLING RESOURCE ENABLERS OF A SECURE WORKSPACE

CROSS-REFERENCE TO RELATED APPLICATIONS

N/A

BACKGROUND

In the context of this application, a workspace refers to an isolated environment in which one or more applications may be hosted on a computing device. A workspace is typically implemented using container technologies and therefore the terms "workspace" and "container" are oftentimes interchanged. Different workspace/container infrastructures may be used to create a workspace. FIG. 1 represents a computing device 100 that has physical hardware 101, a hypervisor 102 and a host operating system 110. Application 121 is an example of an application that is not deployed in a workspace in that it relies on binaries/libraries 120 to interface directly with host operating system 110.

Application 122 is an example of an application that is hosted in a software-based workspace. As represented in FIG. 1, application 122 and its binaries/libraries 131 may be isolated within its own workspace 132 that is executed via a workspace engine 130 that runs on host operating system 110. A Docker container and Snap are common examples of software-based workspaces.

Application 123 is an example of an application that is hosted in a hardware-based workspace. As represented in FIG. 1, with a hardware-based workspace, a uni/mini kernel 140 may be executed on hypervisor 102. A workspace engine 141 can then be run on uni/mini kernel 140 to isolate application 123 and its binaries/libraries 142 in its own workspace 143. A Kata container is a common example of a hardware-based workspace. Hyper-V docker, Photon-OS, and Include OS are also common platforms for creating hardware-based workspaces.

Workspaces are commonly used for security purposes. In the context of this application, a secure workspace will refer to a workspace that is used to isolate an application from resources in the external environment. These resources usually include resources provided by the host operating system such as the clipboard, the file system, etc. and hardware resources such as a webcam, storage drives, a GPU, etc.

In some instances, it may be desired to enable an application running in a secure workspace to access resources in the external environment. To accomplish this, resource enablers can be deployed on the computing device. For example, a resource enabler for the clipboard can include components that run in the secure workspace and in the host environment to convey clipboard data back and forth thus bypassing the security that the secure workspace is intended to provide. As another example, virtualization techniques can be implemented to allow a storage drive or other peripheral to be accessed from within the secure workspace. When a resource enabler is deployed on a computing device, a task that is typically performed by an administrator when configuring the computing device for end user use, the corresponding resource will be delivered into secure workspaces deployed on the computing device and will therefore cause the corresponding resource to be accessible to any application deployed in the secure workspaces. In other words, current resource enablers provide an all or nothing approach and therefore minimize the security that a secure workspace is intended to provide.

BRIEF SUMMARY

The present invention extends to systems, methods and computer program products for selectively validating and enabling resource enablers of a secure workspace. Resource enablers can be configured to selectively allow an application hosted in a secure workspace to access an external resource based on a trust of the application and/or of the external resource. As a result, the security of the secure workspace can be maintained without having to restrict all access to external resources.

In some embodiments, the present invention may be implemented by a local service executing on a user computing device as a method for selectively validating and enabling resource enablers of a secure workspace deployed on the user computing device. The local service can receive, from a resource enabler, a validation request that identifies an application running in a secure workspace and an external resource that the application is attempting to access. The local service can process the validation request to determine whether the application should be enabled to access the external resource. Upon determining that the application should be enabled to access the external resource, the local service can instruct the resource enabler to enable the application to access the external resource.

In some embodiments, the present invention may be implemented as computer storage media storing computer executable instructions which when executed on a user computing device implement a local service that is configured to perform a method for selectively validating and enabling resource enablers of a secure workspace deployed on the user computing device. The local service may retrieve trusted app details and trusted device details. The local service may receive a validation request from a resource enabler that is configured to enable an application hosted in a secure workspace to access one or more external resources. The validation request identifies the application and a first external resource that the application is attempting to access. The local service can process the validation request against one or both of the trusted app details or the trusted device details to determine whether the application should be enabled to access the first external resource. Upon determining that the application should be enabled to access the first external resource, the local service can instruct the resource enabler to enable the application to access the first external resource.

In some embodiments, the present invention may be implemented as a system that includes a management server that hosts a management service and one or more user computing devices. Each user computing device includes a local service that is configured to perform a method for selectively validating and enabling resource enablers of a secure workspace deployed on the user computing device. The local service can retrieve trusted app details and trusted device details from the management service. The local service can receive a validation request from a resource enabler that is configured to enable an application hosted in a secure workspace to access one or more external resources. The validation request identifies the application and a first external resource that the application is attempting to access. The local service can process the validation request against one or both of the trusted app details or the trusted device details to determine whether the application should be enabled to access the first external resource. Upon determining that the application should be enabled to access the first external resource, the local service can instruct the resource enabler to enable the application to access the first external resource.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
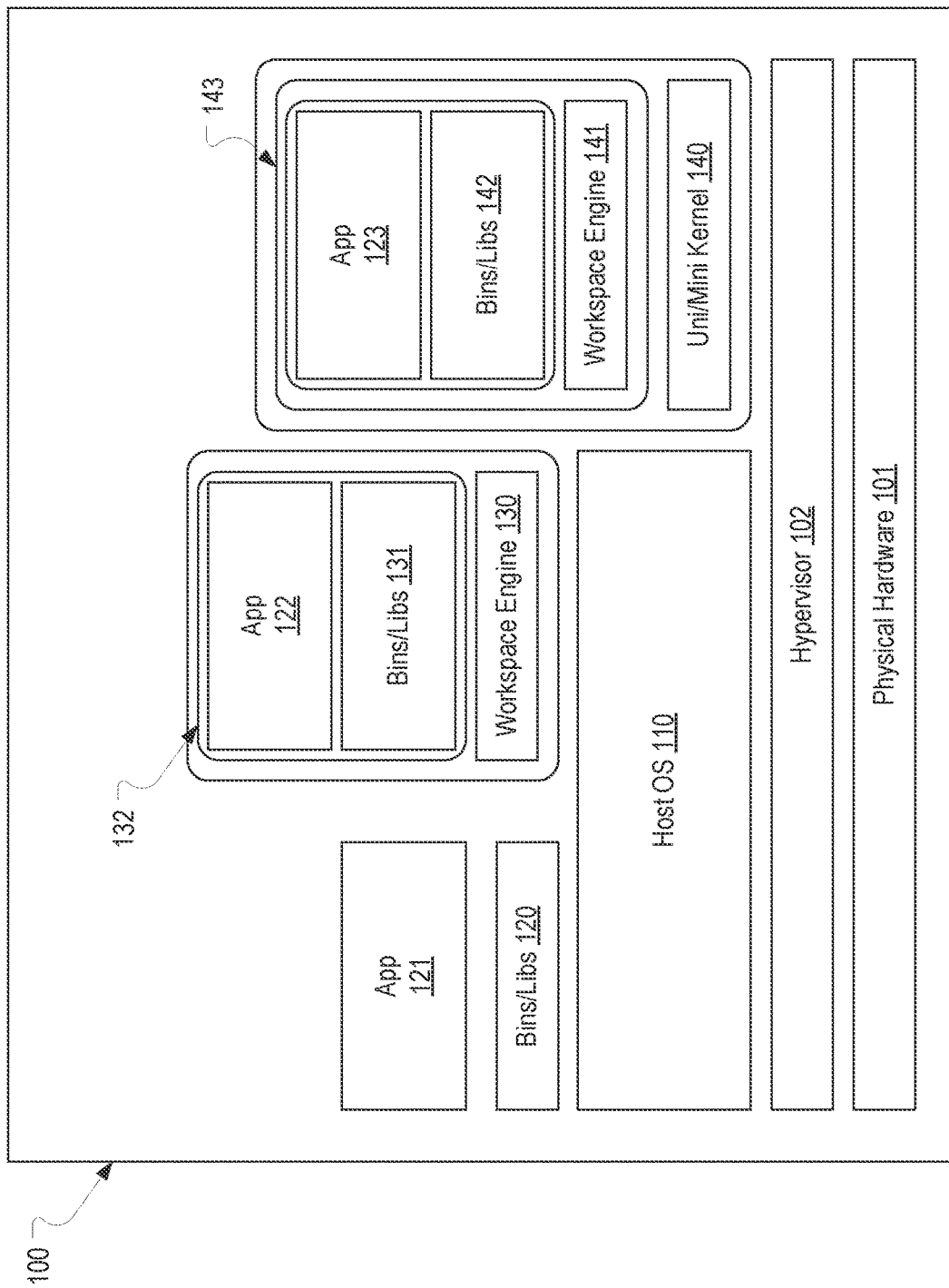
FIG. 1 provides an example of a computing device that includes workspaces.
Figure 2:
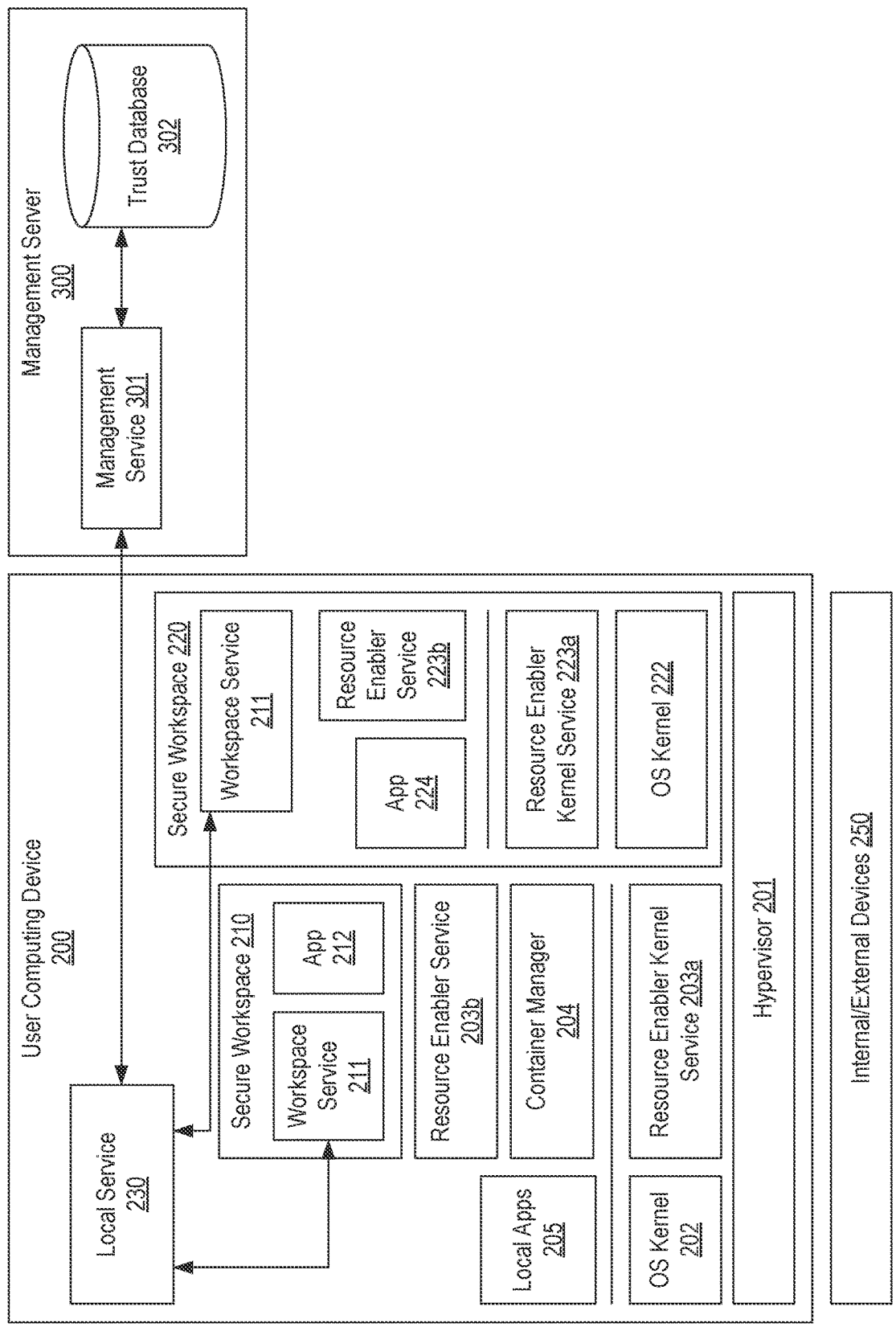
FIG. 2 provides an example of a computing environment in which embodiments of the present invention may be implemented.

FIG. 2 provides an example of a computing environment in which one or more embodiments of the present invention may be implemented. The computing environment includes a user computing device 200 and a management server 300. Management server 300 can include a management service 301 that can be configured to interface with user computing device 200 to perform functionality of embodiments of the present invention. Management server 300 may also include a trust database 302 that management service 301 can use to provide this functionality. In typical scenarios, management service 301 may interface with many user computing devices 200 but only one user computing device 200 is shown for simplicity.

User computing device 200 is shown as having a hypervisor 201 which enables secure workspace 220 in the form of a virtual machine to be deployed on user computing device 200. However, in some embodiments, hypervisor 201 may be omitted from user computing device 200 such as when no virtual-machine-based secure workspaces will be deployed. User computing device 200 also includes an operating system kernel 202 which allows local apps 205 to be run on user computing device 200.

A container manager 204 may be deployed on user computing device 200 to enable the deployment of secure workspace 210 in the form of a software-based container. For example, container manager 204 could represent the Docker daemon when Docker containers are used to implement secure workspaces.

A resource enabler kernel service 203a and corresponding resource enabler service 203b (generally resource enabler 203) can also be deployed in the host OS environment to enable app 212 deployed in secure workspace 210 to access resources external to secure workspace 210. These resources include resources provided by the host OS as well as internal/external devices 250 (or generally devices 250).

Because secure workspace 220 is a virtual machine, it may include an OS kernel 222 which enables app 224 to be run within secure workspace 220. A resource enabler kernel service 223a and corresponding resource enabler service 223b (generally resource enabler 223) may also be deployed in secure workspace 220 and can enable app 224 to access the resources external to secure workspace 220. Resource enablers 203 and 223 are intended to represent the collection of components that enable access to external resources (e.g., allowing clipboard access, allowing file system access, virtualizing internal/external devices 250 within a secure workspace, etc.) and are also configured to implement the functionality described below.

Secure workspaces 210 and 220, and any other secure workspaces that may be deployed on user computing device 200, can include an instance of workspace service 211 that can be configured to perform the functionality described below to enable the selective validation and enabling of resources enablers of the respective secure workspace. Likewise, a local service 230 can be hosted on user computing device 200 in the host OS environment and can be configured to interoperate with the instances of workspace service 211 in the manner described below.

Figure 3A:
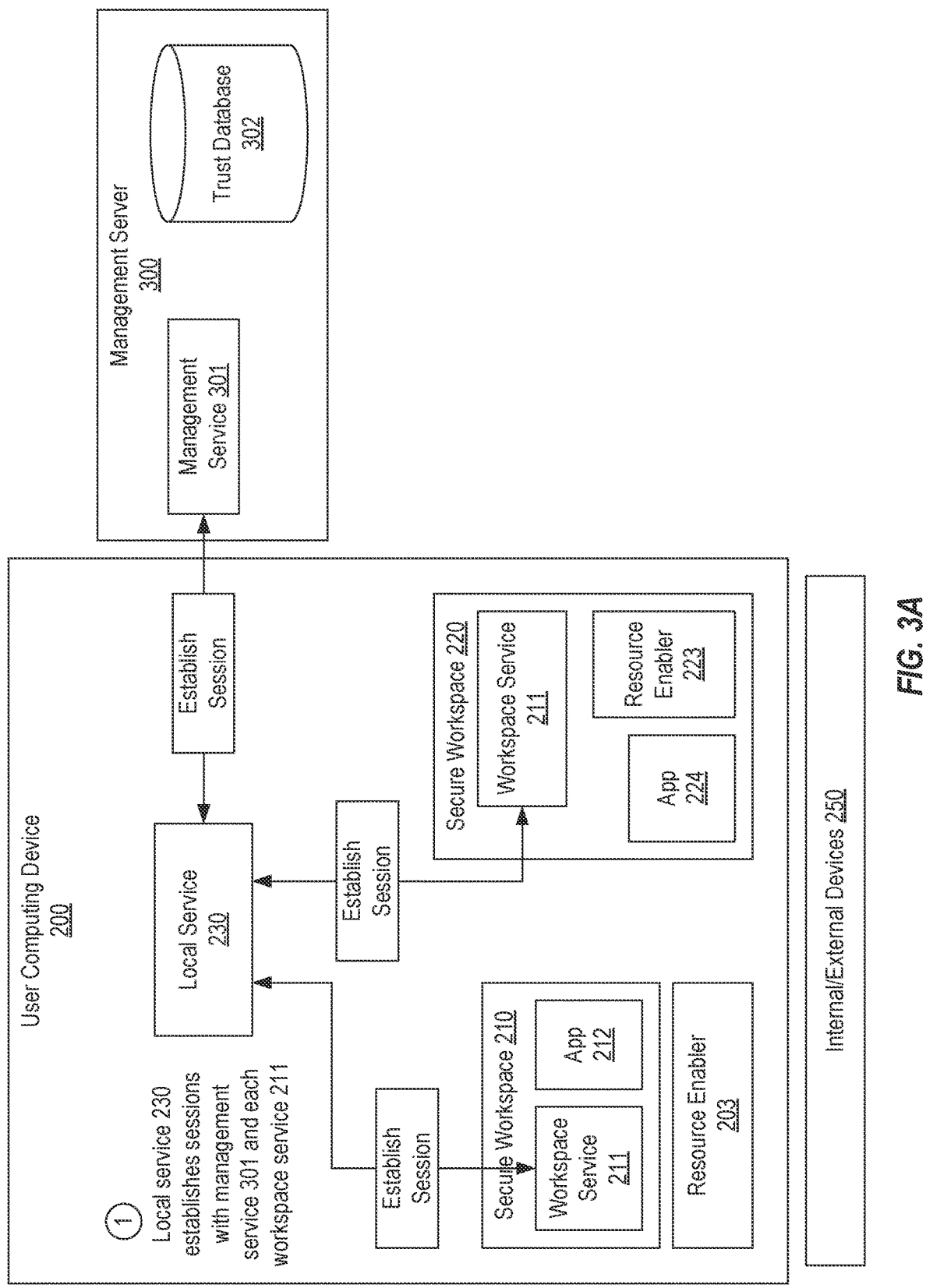
FIGS. 3A-3C provide an example of functionality that may be performed to allow resources enablers to be selectively validated and enabled in accordance with one or more embodiments of the present invention.
Figure 3B:
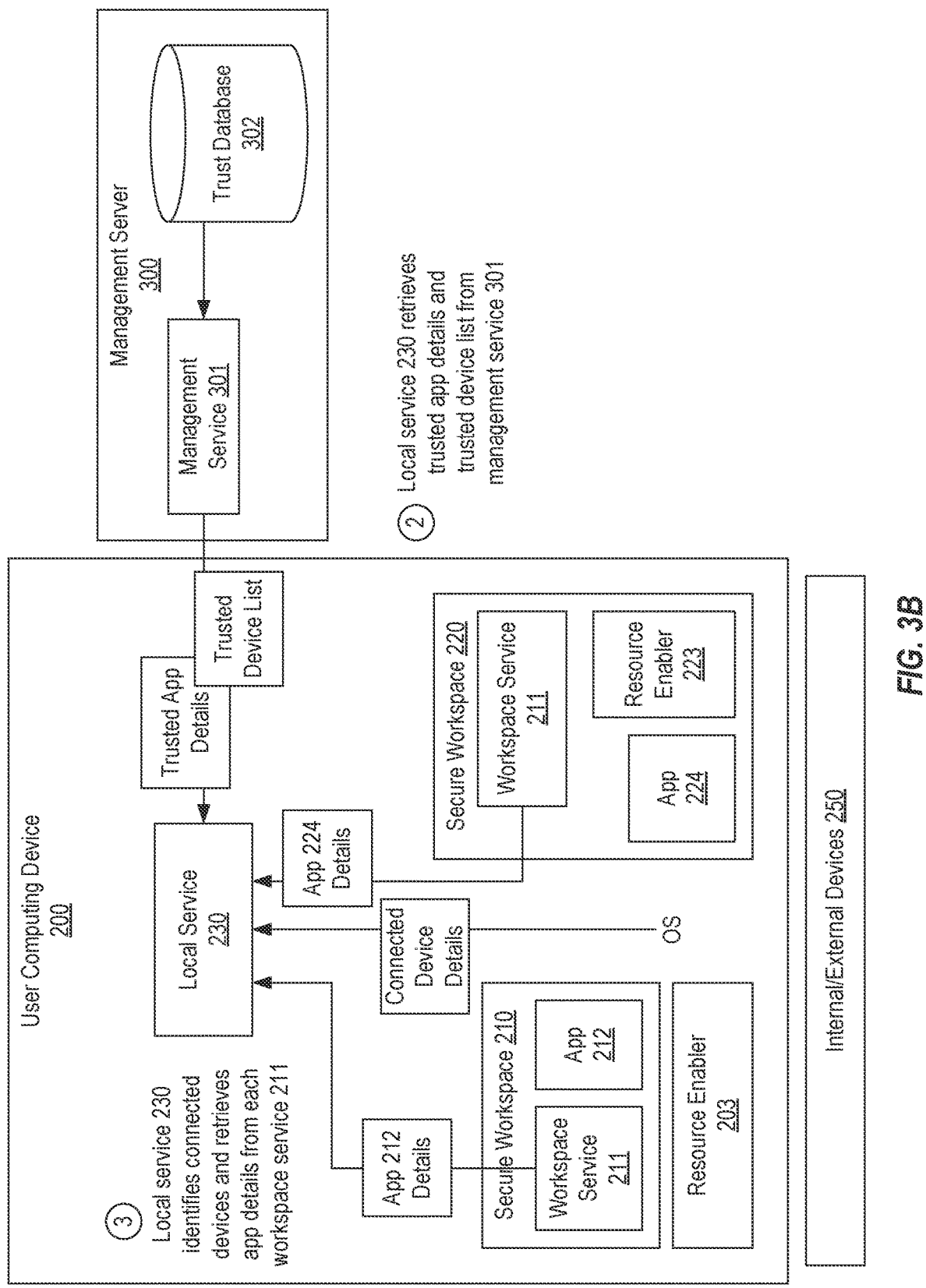
Figure 3C:
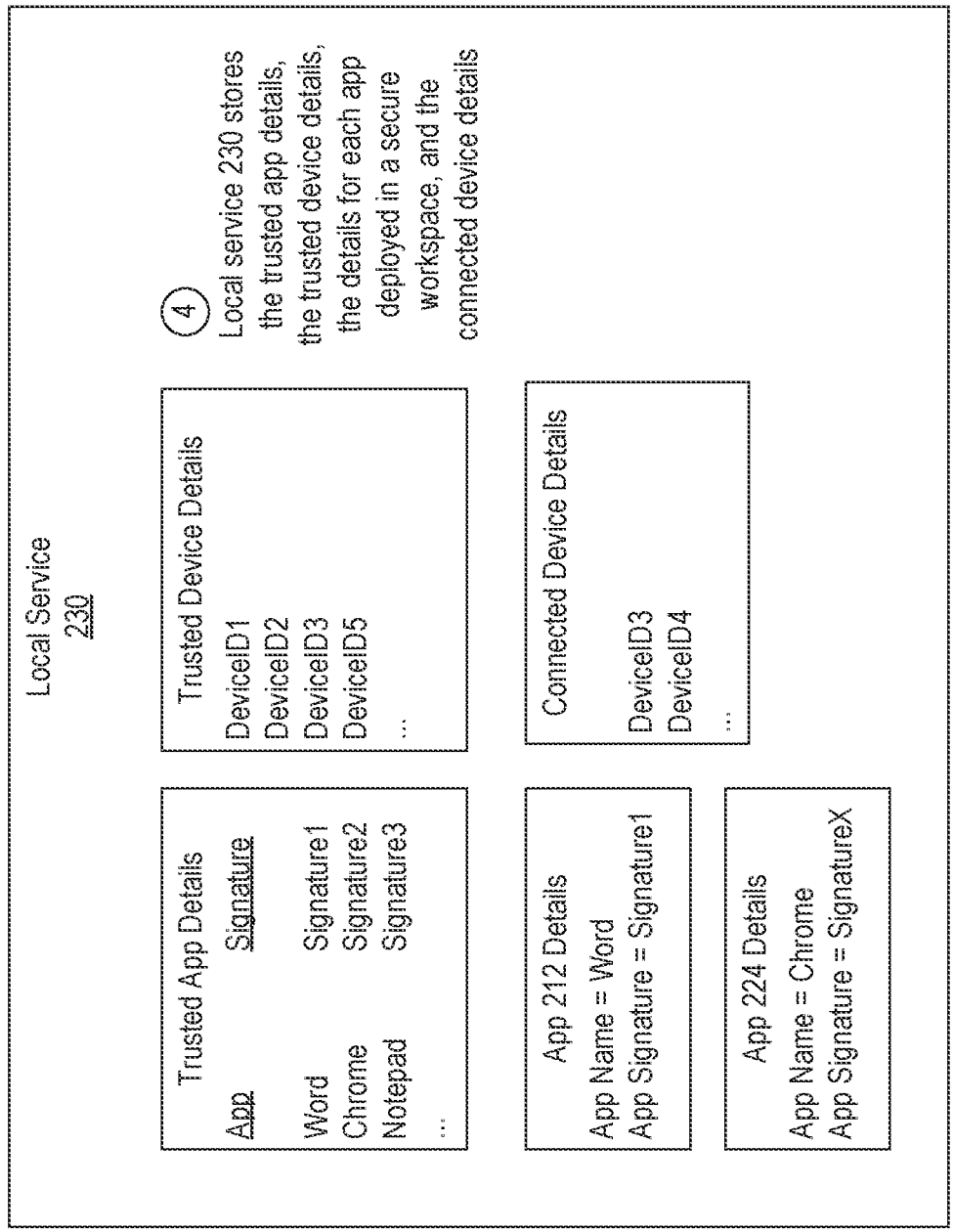

FIGS. 3A-3C provide an example of initialization functionality that may be performed to allow resource enablers 203 and 223 of secure workspaces 210 and 220 respectively to be selectively validated and enabled for apps 212 and 224 (or any other application running in a secure workspace on user computing device 200). In FIG. 3A, it is assumed that local service 230 has been loaded on user computing device 200 and secure workspaces 210 and 220 have been deployed on user computing device 200. In step 1, which local service 230 could perform as part of being loaded, local service 230 may establish a session with management service 301 and each workspace service 211. Local service 230 can use such sessions to communicate with management service 301 and workspace service 211. If additional secure workspaces are deployed on user computing device 200 at a later time, local service 230 could also establish a session with the instance of workspace service 211 running in such secure workspaces. Although not shown, the initialization functionality could include setting up callback functions that resource enablers 203 and 223 can call to request validation of a request to access an external resource as is described below.

Turning to FIG. 3B, in step 2, local service 230 can use the established session to retrieve trusted app details and a trusted device list from management service 301. As indicated, management service 301 could obtain the trusted app details and trusted device list from trust database 302. In some embodiments, an administrator could define the trust app details and trusted device list in trust database. In some embodiments, if there are updates to the trusted app details or trusted device list, management service 301 could push such updates to local service 230 over the established session.

In step 3, local service 230 can obtain connected device details from the operating system on user computing device 200 and details about app 212 and app 224 from workspace service 211 in secure workspaces 210 and 220 respectively. For example, local service 230 could enumerate internal/external devices 250 to obtain various device identifiers and/or other details. Local service 230 could also use the established sessions to request details of any application deployed in secure workspaces 210 and 220. Notably, if there were more than one application deployed in a secure workspace, workspace service 211 could provide details for each of the applications. Local service 230 could retrieve the app details at various times such as whenever an app is run within a secure workspace.

Turning to FIG. 3C, in step 4, local service 230 can store the trusted app details, the trusted device details, the app 212 details, the app 224 details, and the connected device details. Notably, the collection and storage of these details need not be performed at the same time. Local service 230 need only collect the relevant details prior to an application within a secure workspace requesting access to an external resource.

As shown in FIG. 3C, the trusted app details could identify each trusted app (e.g., using the DisplayName in Windows-based embodiments) and provide a signature (or hash) of the trusted app. For example, the signature could be generated from a known-safe version of the app's binary. The trusted device details could include one of more identifiers of a device that is trusted. For example, these identifiers could include USB identifiers, serial numbers, secure identifiers, or any other set of one or more identifiers that can be used to identify a particular device or a particular type of device.

FIG. 3C also shows that the details gathered for app 212 and app 224 include an identifier and a signature of the apps. In this example, it is assumed that app 212 is Word and app 224 is Chrome. Workspace service 211 could obtain the identifier and the signature of app 212 and app 224 such as by querying for the display name of the respective app and generating the signature of the app's binary.

FIG. 3C further shows that the connected device details can include one or more identifiers for each device that is connected to user computing device 100. In this example, it is assumed that devices having identifiers of DeviceID3 and DeviceID4 are connected.

Figure 4A:
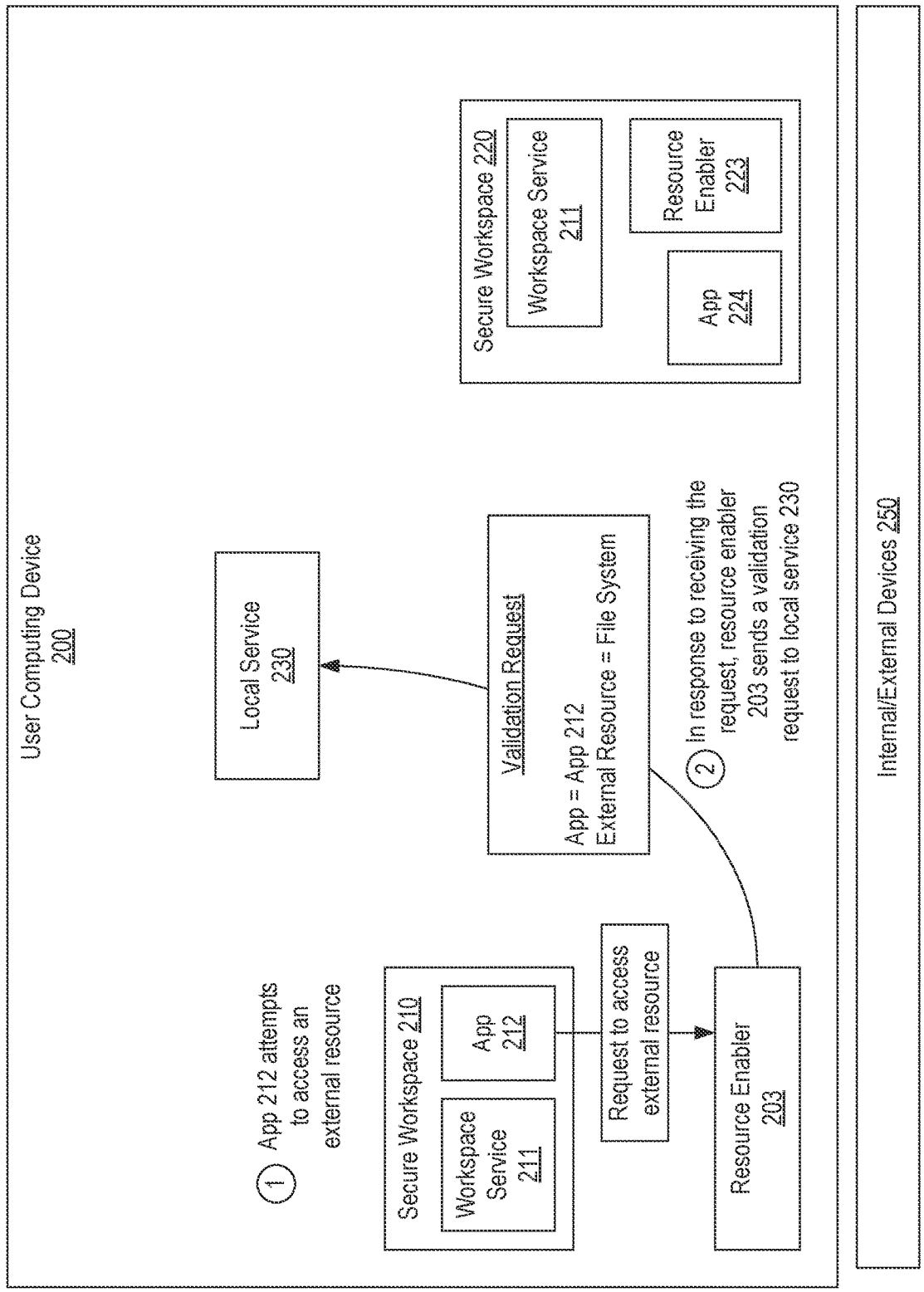
FIGS. 4A-4C provide an example of functionality that may be performed to selectively validate and enable a resource enabler of a secure workspace.
Figure 4B:
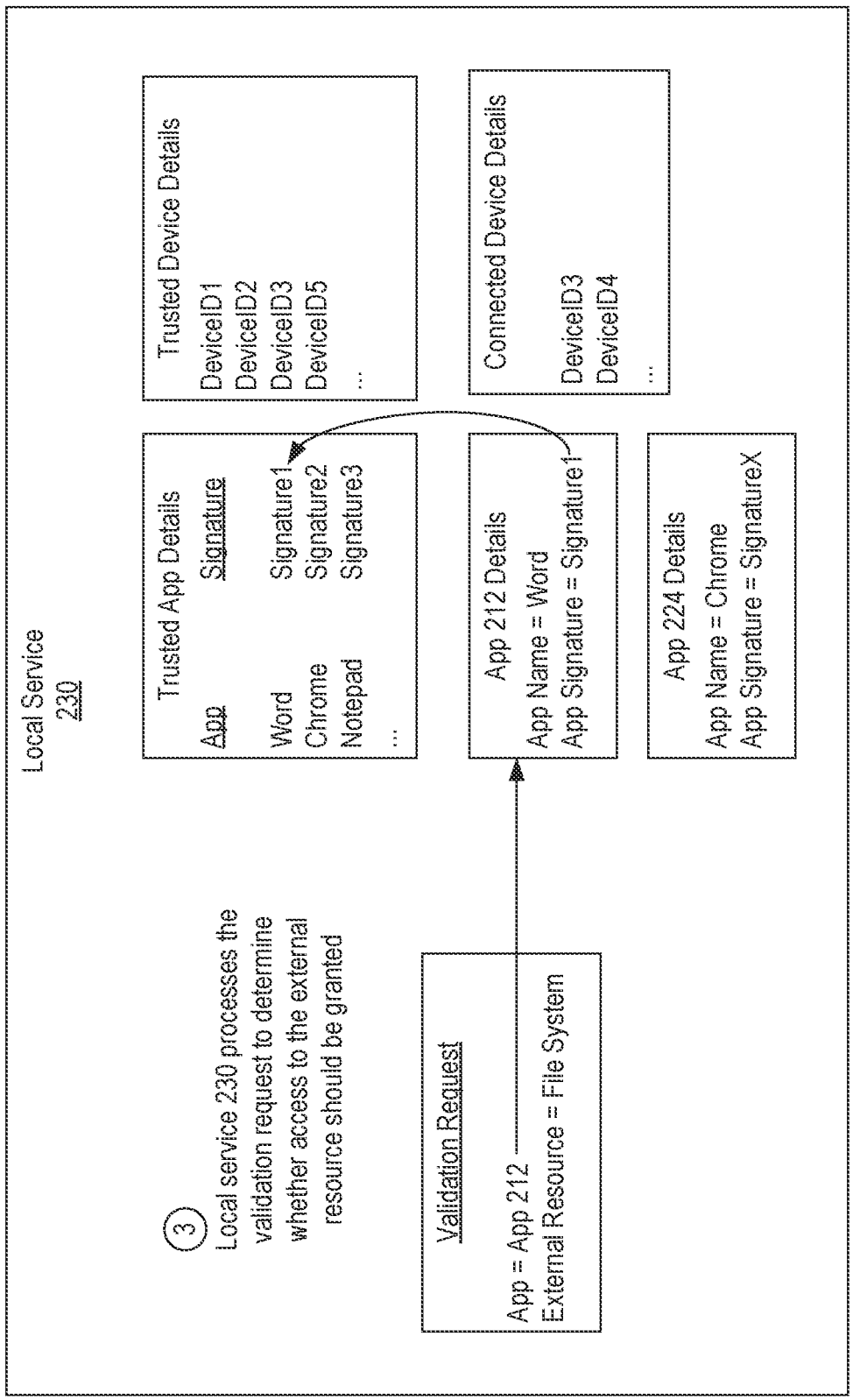
Figure 4C:
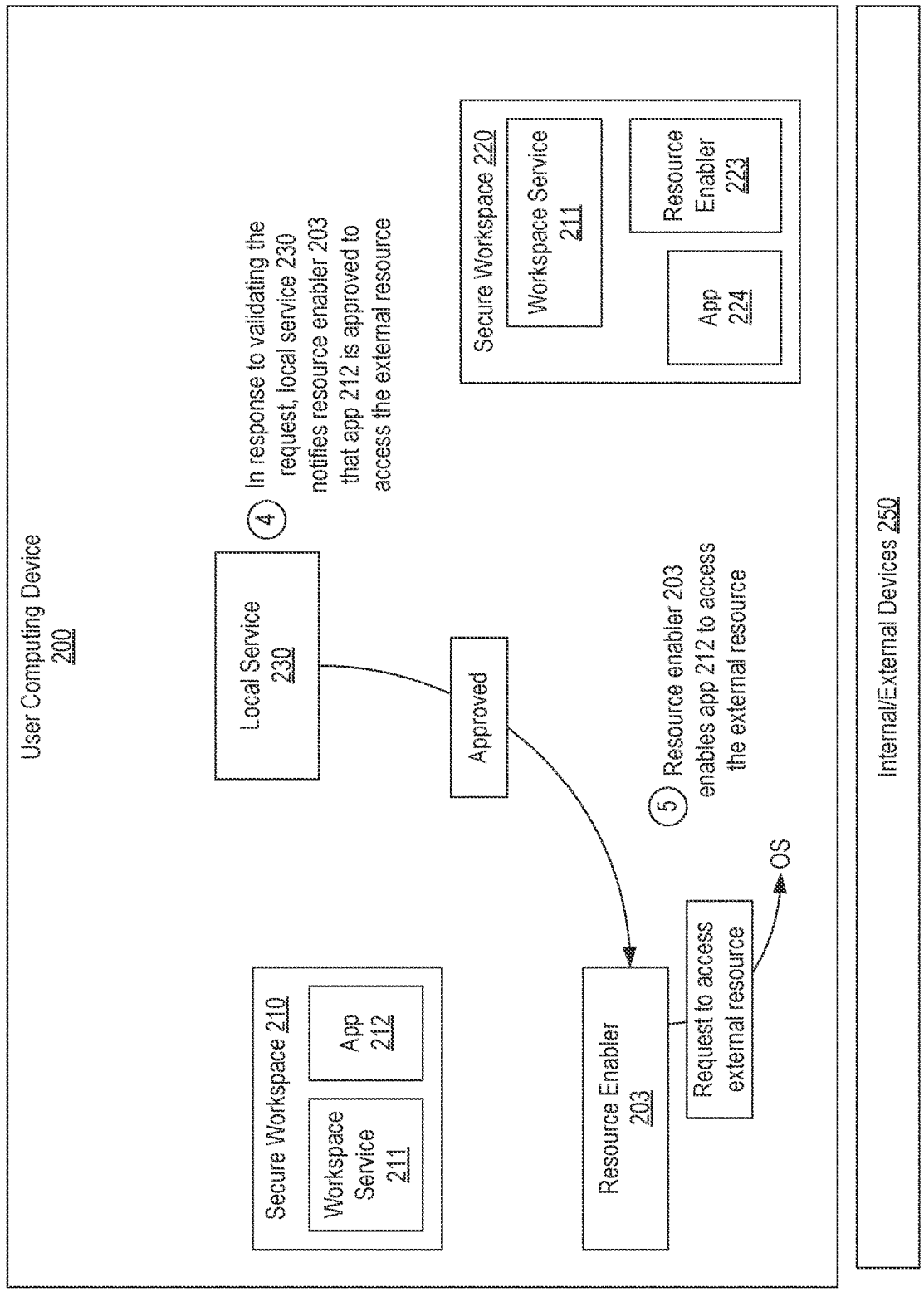

FIGS. 4A-4C provide an example of how resource enabler 203 can be selectively validated and enabled for app 212 in secure workspace 210. In step 1 shown in FIG. 4A, it is assumed that app 212 generates a request to access an external resource. Notably, the external resources are exposed within secure workspace 210 so that app 212 can attempt to access them but the access is selectively validated and enabled in accordance with the techniques of the present invention. In this example, it is assumed that app 212 is attempting to access an external software resource and specifically the file system. In step 2, and in response to receive app 212's request to access the file system, resource enabler 203 can send a validation request to local service 230. In this example, the validation request identifies app 212 as the source of the request to access the external resource and also identifies the file system as the external resource to be accessed.

Turning to FIG. 4B, in step 3, local service 230 processes the validation request to determine whether access to the external resource should be enabled. For example, local service 230 can identify from the validation request that app 212 is requesting access to a software resource and can locate the details about app 212 that had been previously stored. Local service 230 can then determine whether the details about app 212 are included in the trusted app details that local service 230 received from management service 301. In this example, the signature of app 212 matches the signature for Word defined in the trusted app details. Therefore, local service 230 can know that app 212 running in secure workspace 210 is a version of Word that is known to be trusted. In comparison, this verification could fail in cases where Word is not authorized to be run in secure workspaces, in which case an entry may not exist in the trusted app details, or where the user has added an authorized plugin to Word or some other modification has been made to Word, in which case the signature for Word/app 212 may not match the signature for Word in the trusted app details.

Turning to FIG. 4C, in step 4, and in response to validating app 212's request to access the external resource, local service 230 can notify resource enabler 203 that app 212 is approved to access the external resource. Then, in step 5, resource enabler 203 can selectively enable app 212's access to the external resource. In this example, this would entail allowing app 212 to access the file system such as to access or create a file. In some embodiments, resource enabler 203 could cache the approval of app 212's access to the file system so that resource enabler 203 could immediately enable app 212's subsequent requests to access the file system (e.g., until secure workspace 210 or app 212 is closed). In other embodiments, steps 2-5 could be repeated for any subsequent request app 212 may make.

Accordingly, the external resources can be exposed within secure workspace 210 and therefore will appear available to app 212, but app 212's ability to access an external resource is dynamically and selectively determined when app 212 requests such access. In this way, the security of secure workspace 210 is maintained without having to restrict all access to external resources.

Figure 5A:
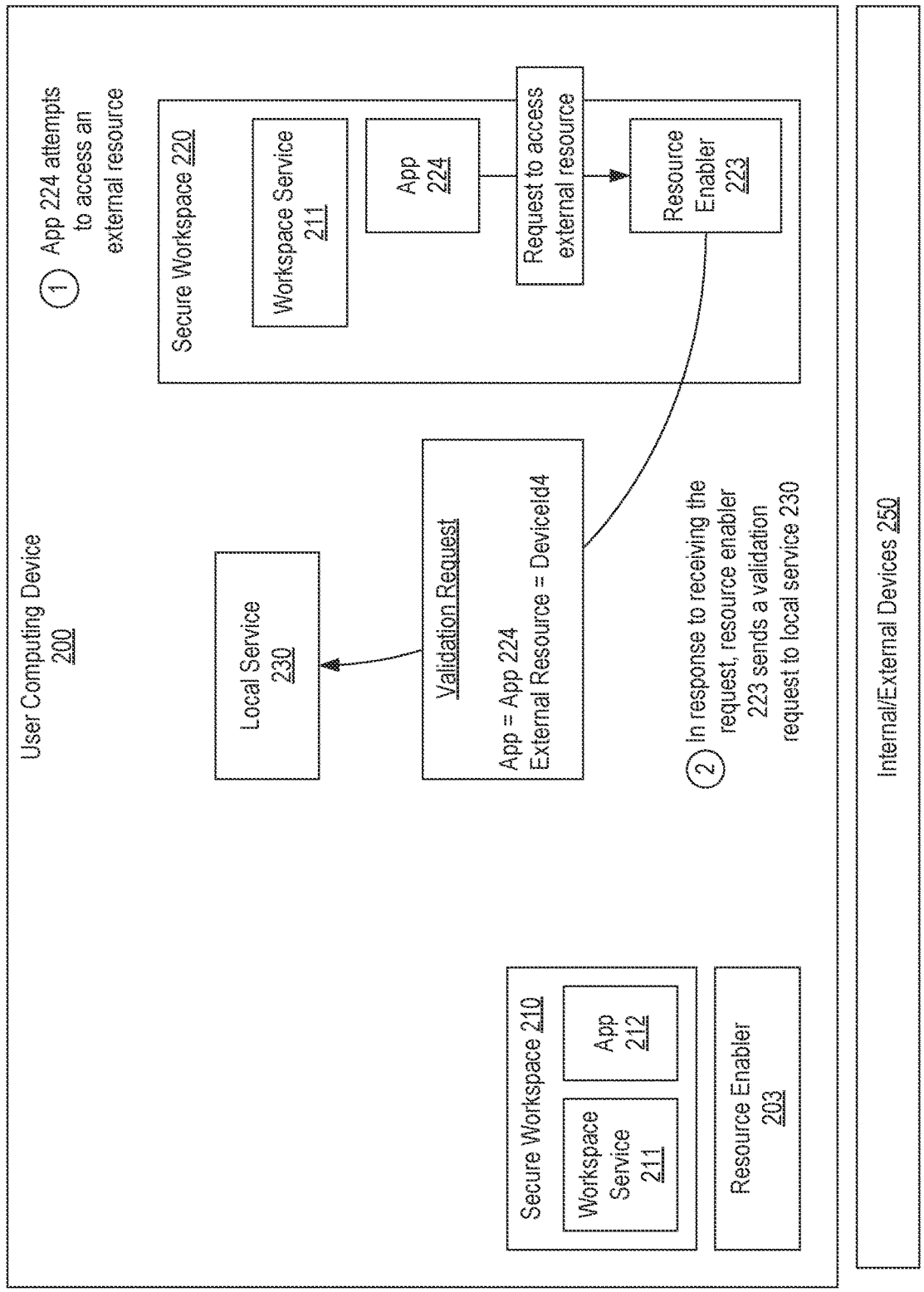
FIGS. 5A-5C provide another example of functionality that may be performed to selectively validate and enable a resource enabler of a secure workspace.
Figure 5B:
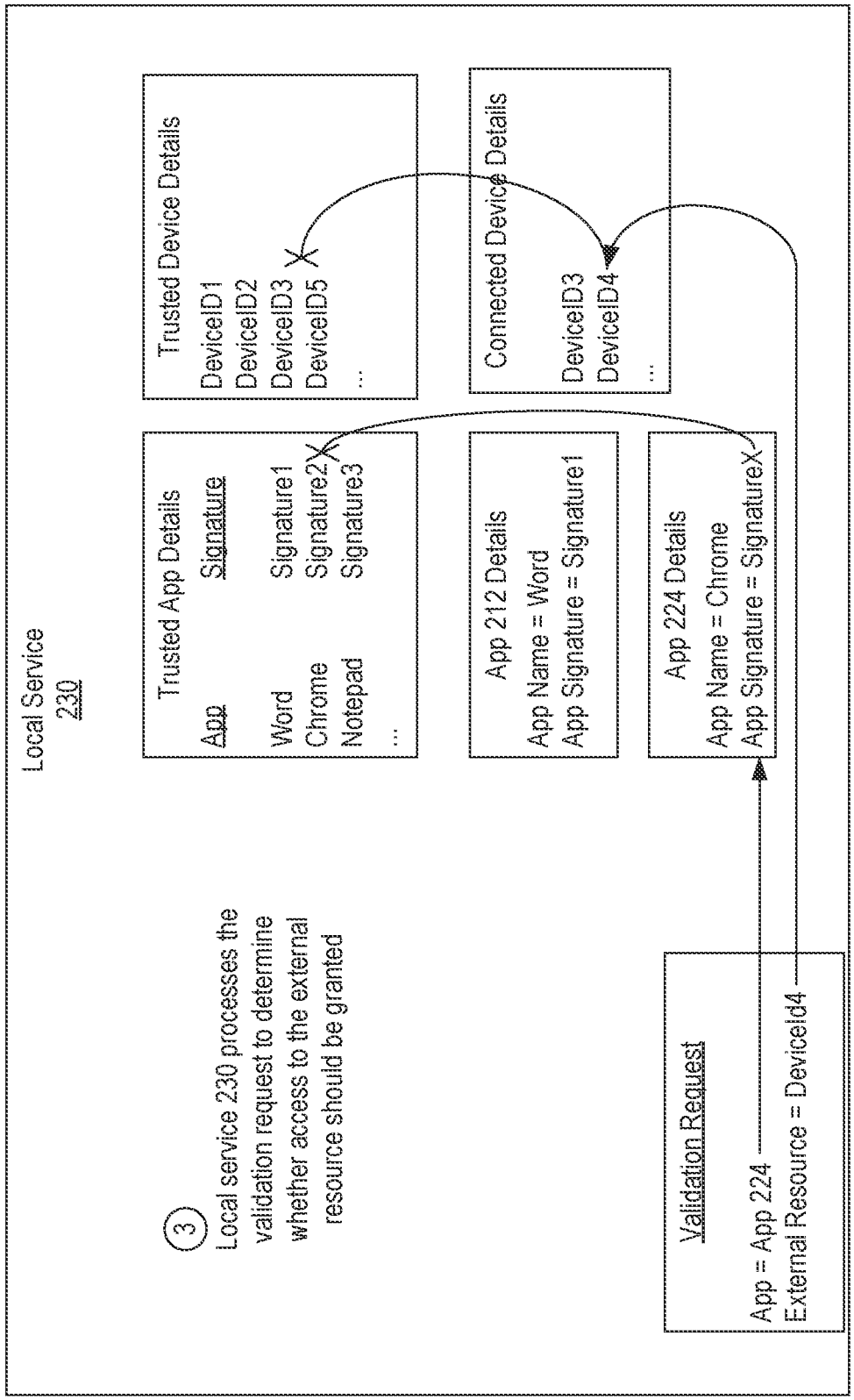
Figure 5C:
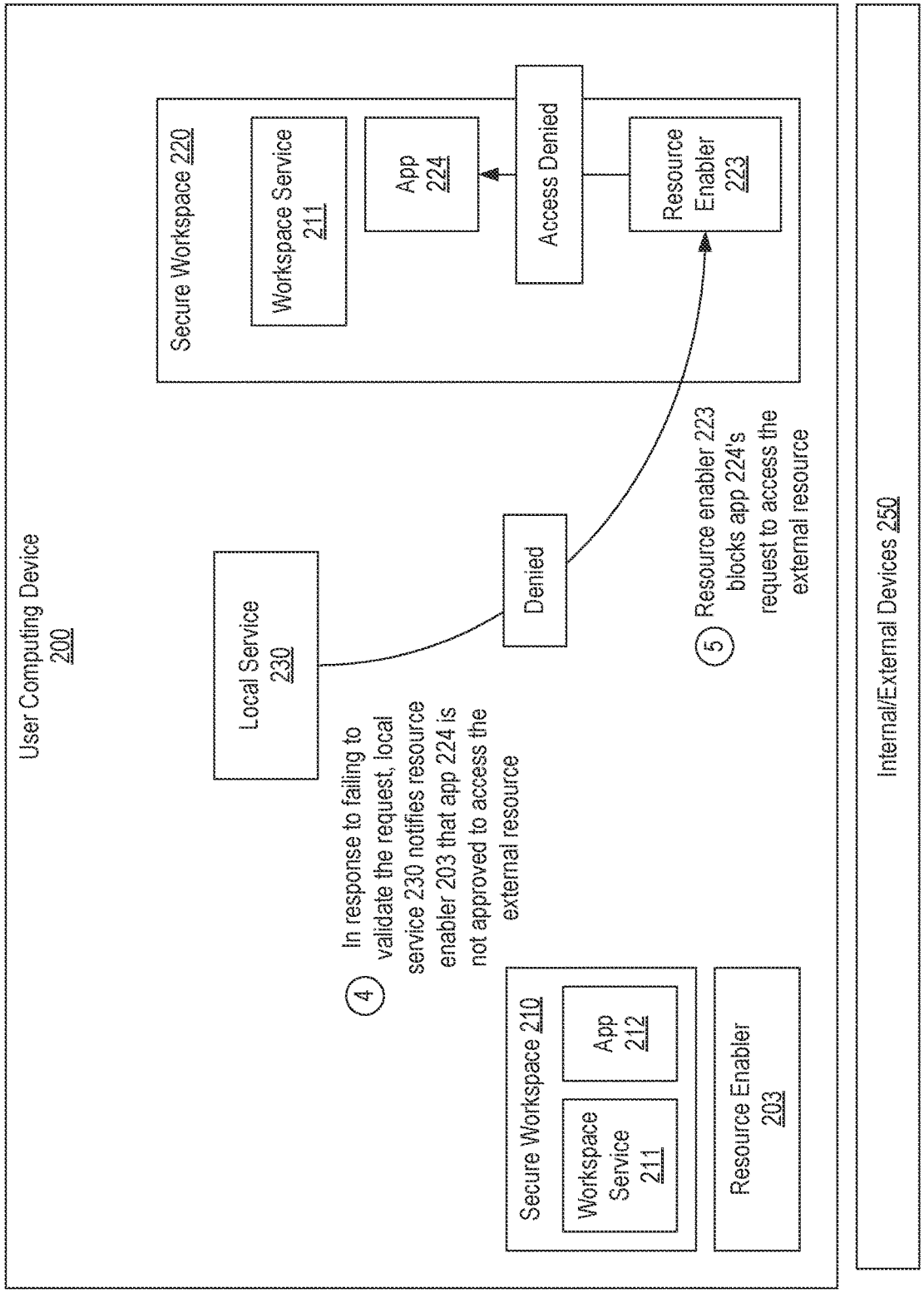

FIGS. 5A-5C provide another example of how resource enabler 223 can be selectively validated and enabled for app 224 in secure workspace 220. In step 1 shown in FIG. 5A, it is assumed that app 224 generates a request to access an external resource. Again, the external resources are exposed within secure workspace 220 so that app 224 can attempt to access them but the access is selectively validated and enabled in accordance with the techniques of the present invention. In this example, it is assumed that app 224 is attempting to access an external hardware resource and specifically one of internal/external devices 250. In step 2, and in response to receive app 224's request to access the internal/external device 250, resource enabler 223 can send a validation request to local service 230. In this example, the validation request identifies app 224 as the source of the request to access the external resource and also includes one or more identifiers of (or other information about) the external resource to be accessed.

Turning to FIG. 5B, in step 3, local service 230 processes the validation request to determine whether access to the external resource should be enabled. For example, local service 230 can identify from the validation request that app 224 is requesting access to a connected device and can locate the details about app 224 that had been previously stored. Local service 230 can then determine whether the details about app 224 are included in the trusted app details that local service 230 received from management service 301. In this example, the signature of app 224 does not match the signature for Chrome defined in the trusted app details (e.g., because an unauthorized plugin has been added to Chrome).

In some embodiments, because app 224 is not trusted, local service 230 could notify resource enabler 223 that the request should be denied. For illustrative purposes, however, FIG. 5B also shows that local service 230 can also determine whether the connected device that app 224 desires to access is trusted. For example, local service 230 can obtain the identifier included in the validation request and determine whether it is included in the trusted device details. In this example, it is assumed that DeviceID4 is not included in the trusted device details which may be the case when the user has connected an unauthorized device or when the targeted device is otherwise not approved for access to applications within secure workspaces. Notably, if either the requesting app or the targeted external resource is not trusted, local service 230 can disapprove the request.

In some embodiments, local service 230 can leverage information in the connected device details as part of determining whether an external hardware resource is trusted. For example, the connected device details can greater information about an external hardware resource than what is provided in a validation request. In such cases, local service 230 could employ information provided in the validation request to identify the corresponding information in the connected device details and then compare this corresponding information to the trusted device details.

Turning to FIG. 5C, in step 4, and in response to failing to validate app 224's request to access the external resource, local service 230 can notify resource enabler 223 that app 224 is not approved to access the external resource. Then, in step 5, resource enabler 223 can block app 224's request to access the external resource. In this example, this could entail completing app 224's request with "access denied" are a similar status code. In comparison, if the request had been approved, resource enabler 223 could enable the access to the internal/external device 250 such as by creating a virtual representation of the internal/external device 250 in secure workspace 220.

In some cases, a request to access an external resource can involve more than one application. For example, with reference to FIGS. 4A-4C, if app 212 were instead requesting access to a clipboard to copy data from one of local apps 205 or vice versa, the validation request could identify both applications (e.g., by identifying which app copied the content to the clipboard and which app is attempting to copy the content from the clipboard). In such a case, local service 230 could determine whether both applications are trusted, and if not, can prevent the requested access. Accordingly, the trusted app details can include applications that may be run in a secure workspace or locally. However, in some embodiments, the validation of a request to access the clipboard could be performed as represented in FIGS. 4A-4C (e.g., by considering only whether the application accessing the clipboard is trusted).

In some embodiments, when an app running in a secure workspace is determined to be untrusted, the entire secure workspace can be deemed untrusted. In other words, any application running within the secure workspace hosting the untrusted app can be untrusted for purposes of determining whether to enable the application to access external resources. To facilitate such embodiments, a validation request can identify the secure workspace in addition to the application that is requesting access to an external resource.

In some embodiments, when a validation request pertains to the clipboard, local service 230 may be configured to verify the content to be copied to or from the clipboard as part of determining whether to validate the request. Local service 230 may do so to implement digital rights management or to otherwise selectively control the type of content that a trusted application may be allowed to copy or paste.

In summary, embodiments of the present invention can be implemented on a user computing device to selectively enable resource enablers for applications running in secure workspaces. As a result, these resource enablers can selectively allow an application's requests to access external resources without jeopardizing the security of the secure workspace.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a local service executing on a user computing device, for selectively validating and enabling resource enablers of a secure workspace deployed on the user computing device, the method comprising:

storing, by the local service that is executing on the user computing device, trusted app details which include a list of signatures of trusted applications;

receiving, at the local service and from a resource enabler that is also executed on the user computing device, a validation request that identifies an application running in a secure workspace on the user computing device and an external resource that the application is attempting to access, the external resource being available on the user computing device outside of the secure workspace;

processing, by the local service, the validation request to determine whether the application should be enabled to access the external resource, wherein determining whether the application should be enabled to access the external resource comprises comparing a signature of the application that is running in the secure workspace to the list of signatures of trusted applications included in the trusted app details stored by the local service;

determining that the application should be enabled to access the external resource by determining that the signature of the application is included in the list of signatures of trusted applications; and upon determining that the application should be enabled to access the external resource, instructing the resource enabler to enable the application to access the external resource from within the secure workspace.

2. The method of claim 1, wherein the signature of the application comprises a hash or an encrypted hash.

3. The method of claim 1, wherein the external resource is a software resource.

4. The method of claim 3, wherein the software resource is a clipboard or a file system.

5. The method of claim 1, wherein the external resource is a hardware device and wherein determining that the application should be enabled to access the external resource comprises determining that the hardware device is trusted.

6. The method of claim 5, wherein determining that the hardware device is trusted comprises determining that one or more identifiers of the hardware device that are included in the validation request match one or more stored identifiers.

7. The method of claim 1, further comprising:
receiving, from the resource enabler, a second validation request that identifies a second application running in a secure workspace and an external resource that the second application is attempting to access;
processing the second validation request to determine whether the second application should be enabled to access the external resource; and
upon determining that the second application should not be enabled to access the external resource, instructing the resource enabler to block the second application from accessing the external resource.

8. The method of claim 7, wherein determining that the second application should not be enabled to access the external resource comprises one or both of determining that the second application is untrusted or determining that the external resource is untrusted.

9. The method of claim 1, wherein the trusted app details are received from a management server.

10. The method of claim 9, wherein the local service also receives trusted device details from the management server.

11. The method of claim 10, wherein the trusted device details include one or more identifiers of trusted devices.

12. One or more computer storage media storing computer executable instructions which when executed on a user computing device implement a local service that is configured to perform a method for selectively validating and enabling resource enablers of a secure workspace deployed on the user computing device, the method comprising:

storing, by the local service that is executing on the user computing device, trusted app details which include a list of signatures of trusted applications;

receiving, at the local service and from a resource enabler that is also executed on the user computing device, a validation request that identifies an application running in a secure workspace on the user computing device and an external resource that the application is attempting to access, the external resource being available on the user computing device outside of the secure workspace;

processing, by the local service, the validation request to determine whether the application should be enabled to access the external resource, wherein determining whether the application should be enabled to access the external resource comprises comparing a signature of the application that is running in the secure workspace to the list of signatures of trusted applications included in the trusted app details stored by the local service;

determining that the application should be enabled to access the external resource by determining that the signature of the application is included in the list of signatures of trusted applications; and upon determining that the application should be enabled to access the external resource, instructing the resource enabler to enable the application to access the external resource from within the secure workspace.

13. The computer storage media of claim 12, wherein the signature of the application comprises a hash or an encrypted hash.

14. The computer storage media of claim 12, wherein the local service also stores trusted device details, and wherein the method further comprises:
receiving a second validation request from a second resource enabler that is configured to enable a second application hosted in a second secure workspace to access one or more external resources, the second validation request identifying the second application and a first external resource that the second application is attempting to access;
processing the second validation request against one or both of the trusted app details or the trusted device details to determine whether the second application should be enabled to access the first external resource; and
upon determining that the second application should not be enabled to access the first external resource, instructing the second resource enabler to block the second application from accessing the first external resource.

15. A system comprising:
a management server that hosts a management service; and
one or more user computing devices, each user computing device including a local service that is configured to perform a method for selectively validating and enabling resource enablers of a secure workspace deployed on the user computing device, the method comprising:
retrieving trusted app details and trusted device details from the management service, the trusted app details including a list of signatures of trusted applications and the trusted device details including a list of identifiers of trusted devices;
receiving, at the local service and from a resource enabler that is also executed on the user computing device, a validation request that identifies an application running in a secure workspace on the user computing device and an external resource that the application is attempting to access, the external resource being available on the user computing device outside of the secure workspace;

processing, by the local service, the validation request to determine whether the application should be enabled to access the external resource, wherein determining whether the application should be enabled to access the external resource comprises comparing a signature of the application that is running in the secure workspace to the list of signatures of trusted applications included in the trusted app details stored by the local service;

determining that the application should be enabled to access the external resource by determining that the signature of the application is included in the list of signatures of trusted applications; and upon determining that the application should be enabled to access the external resource, instructing the resource enabler to enable the application to access the external resource from within the secure workspace.

16. The system of claim 15, wherein determining that the application should be enabled to access the external resource comprises determining that the external resource is trusted by comparing an identifier of the external resource to the list of identifiers of trusted devices.

17. The system of claim 15, wherein the trusted app details and the trusted device details are received from a management server.

18. The system of claim 15, wherein the method further comprises:

receiving, from the resource enabler, a second validation request that identifies a second application running in a secure workspace and an external resource that the second application is attempting to access;

processing the second validation request to determine whether the second application should be enabled to access the external resource; and upon determining that the second application should not be enabled to access the external resource, instructing the resource enabler to block the second application from accessing the external resource.

19. The system of claim 15, wherein the external resource is a software resource.

20. The system of claim 19, wherein the software resource is a clipboard or a file system.

* * * * *